United States Patent
Klimanis et al.

(10) Patent No.: US 11,218,796 B2
(45) Date of Patent: Jan. 4, 2022

(54) ANNOYANCE NOISE SUPPRESSION

(71) Applicant: Dolby Laboratories Licensing Corporation, San Francisco, CA (US)

(72) Inventors: Gints Klimanis, Sunnyvale, CA (US); Anthony Parks, New York City, NY (US); Richard Fritz Lanman, III, San Francisco, CA (US); Noah Kraft, New York City, NY (US); Matthew J. Jaffe, San Francisco, CA (US); Jeffrey Ross Baker, Thousand Oaks, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/735,601

(22) Filed: Jan. 6, 2020

(65) Prior Publication Data
US 2020/0389718 A1    Dec. 10, 2020

Related U.S. Application Data

(63) Continuation of application No. 15/775,153, filed as application No. PCT/US2016/043819 on Jul. 25, (Continued)

(51) Int. Cl.
*H04R 1/10*    (2006.01)
*G10L 21/0208*    (2013.01)
(Continued)

(52) U.S. Cl.
CPC ........ *H04R 1/1083* (2013.01); *G10L 21/0208* (2013.01); *G10L 21/0232* (2013.01);
(Continued)

(58) Field of Classification Search
None
See application file for complete search history.

(56) References Cited

U.S. PATENT DOCUMENTS 6,523,003 B1    2/2003    Chandran
2003/0121403 A1    7/2003    Miyagishima
(Continued)

FOREIGN PATENT DOCUMENTS

CN    101609685    12/2009
CN    102572649    7/2012
(Continued)

OTHER PUBLICATIONS

Jinyuan, Yu, "Comparison of Capacitors in Sound System Dividers" Electroacoustic technology, vol. 35, No. 1, Jan. 17, 2011.
(Continued)

*Primary Examiner* — Paul W Huber

(57) ABSTRACT

Personal audio systems and methods are disclosed. A personal audio system includes a voice activity detector to determine whether or not an ambient audio stream contains voice activity, a pitch estimator to determine a frequency of a fundamental component of an annoyance noise contained in the ambient audio stream, and a filter bank to attenuate the fundamental component and at least one harmonic component of the annoyance noise to generate a personal audio stream. The filter bank implements a first filter function when the ambient audio stream does not contain voice activity, or a second filter function when the ambient audio stream contains voice activity.

13 Claims, 10 Drawing Sheets

Related U.S. Application Data 2016, now Pat. No. 10,531,178, which is a continuation of application No. 14/952,761, filed on Nov. 25, 2015, now Pat. No. 9,678,709, and a continuation of application No. 14/941,458, filed on Nov. 13, 2015, now Pat. No. 9,589,574.

(51) Int. Cl.

| | | |
|---|---|---|
| *G10L 21/0232* | (2013.01) | |
| *G10L 25/84* | (2013.01) | |
| *G10L 25/90* | (2013.01) | |
| *H04R 29/00* | (2006.01) | |
| *G10L 21/0216* | (2013.01) | |

(52) U.S. Cl.
CPC .............. *G10L 25/84* (2013.01); *G10L 25/90* (2013.01); *H04R 29/004* (2013.01); *G10L 2021/02085* (2013.01); *G10L 2021/02163* (2013.01); *H04R 2410/07* (2013.01); *H04R 2460/01* (2013.01)

(56) References Cited

U.S. PATENT DOCUMENTS

| | | |
|---|---|---|
| 2006/0204025 A1 | 9/2006 | Paludan-Muller |
| 2007/0055508 A1 | 3/2007 | Zhao |
| 2009/0190772 A1 | 7/2009 | Osada |
| 2009/0254340 A1 | 10/2009 | Sun |
| 2010/0040249 A1 | 2/2010 | Lenhardt |
| 2010/0086137 A1 | 4/2010 | Nicolino, Jr. |
| 2011/0158420 A1 | 6/2011 | Hannah |
| 2011/0166856 A1 | 7/2011 | Lindahl |
| 2012/0010881 A1 | 1/2012 | Avendano |
| 2012/0189140 A1 | 7/2012 | Hughes |
| 2013/0058489 A1 | 3/2013 | Tanaka |
| 2013/0073283 A1 | 3/2013 | Yamabe |
| 2013/0293747 A1 | 11/2013 | Yoshizuka |
| 2014/0314245 A1 | 10/2014 | Asada |
| 2014/0314261 A1 | 10/2014 | Selig |
| 2015/0162021 A1 | 6/2015 | Anhari |
| 2015/0279386 A1 | 10/2015 | Skoglund |
| 2015/0312677 A1 | 10/2015 | Kraft |
| 2016/0005422 A1 | 1/2016 | Zad Issa |

FOREIGN PATENT DOCUMENTS

| | | |
|---|---|---|
| CN | 103621110 | 3/2014 |
| CN | 204334562 | 5/2015 |
| EP | 2823853 | 1/2015 |
| WO | 2011111103 | 9/2011 |
| WO | 2011149969 | 4/2012 |

OTHER PUBLICATIONS

Ke, Xiao "Research on Audio Coding and AGC Technology in Digital Conference System" full-text database of China's outstanding Master's thesis, Jun. 15, 2006.

ANNOYANCE NOISE SUPPRESSION

CROSS-REFERENCE TO RELATED APPLICATIONS

This is a continuation of U.S. patent application Ser. No. 15/775,153 filed May 10, 2018, which is the U.S. national stage of International Patent Application No. PCT/US2016/043819 filed Jul. 25, 2016, which in turn claims priority to U.S. patent application Ser. No. 14/952,761 filed Nov. 25, 2015, now U.S. Pat. No. 9,678,709 issued Jun. 13, 2017, and U.S. patent application Ser. No. 14/941,458 filed Nov. 13, 2015, now U.S. Pat. No. 9,589,574 issued Mar. 7, 2017, all of which are incorporated by reference in their entirety.

This patent is related to patent application Ser. No. 14/681,843 filed Apr. 8, 2015, and patent application Ser. No. 14/819,298 filed Aug. 5, 2015.

BACKGROUND

Field

This disclosure relates generally to digital active audio filters for use in a listener's ear to modify ambient sound to suit the listening preferences of the listener. In particular, this disclosure relates to active audio filters that suppress annoyance noised based, in part, on user identification of the type of annoyance noise and/or suppress noise based on information collected from a large plurality of users.

Description of the Related Art

Humans' perception to sound varies with both frequency and sound pressure level (SPL). For example, humans do not perceive low and high frequency sounds as well as they perceive midrange frequencies sounds (e.g., 500 Hz to 6,000 Hz). Further, human hearing is more responsive to sound at high frequencies compared to low frequencies.

There are many situations where a listener may desire attenuation of ambient sound at certain frequencies, while allowing ambient sound at other frequencies to reach their ears. For example, at a concert, concert goers might want to enjoy the music, but also be protected from high levels of mid-range sound frequencies that cause damage to a person's hearing. On an airplane, passengers might wish to block out the roar of the engine, but not conversation. At a sports event, fans might desire to hear the action of the game, but receive protection from the roar of the crowd. At a construction site, a worker may need to hear nearby sounds and voices for safety and to enable the construction to continue, but may wish to protect his or her ears from sudden, loud noises of crashes or large moving equipment. Further, a user may wish to engage in conversation and other activities without being interrupted or impaired by annoyance noises such as sounds of engines or motors, crying babies, and sirens. These are just a few common examples where people wish to hear some, but not all, of the sound frequencies in their environment.

In addition to receiving protection from unpleasant or dangerously loud sound levels, listeners may wish to augment the ambient sound by amplification of certain frequencies, combining ambient sound with a secondary audio feed, equalization (modifying ambient sound by adjusting the relative loudness of various frequencies), noise reduction, addition of white or pink noise to mask annoyances, echo cancellation, and addition of echo or reverberation. For example, at a concert, audience members may wish to attenuate certain frequencies of the music, but amplify other frequencies (e.g., the bass). People listening to music at home may wish to have a more "concert-like" experience by adding reverberation to the ambient sound. At a sports event, fans may wish to attenuate ambient crowd noise, but also receive an audio feed of a sportscaster reporting on the event. Similarly, people at a mall may wish to attenuate the ambient noise, yet receive an audio feed of advertisements targeted to their location. These are just a few examples of peoples' audio enhancement preferences.

Further, a user may wish to engage in conversation and other activities without being interrupt or impaired by annoyance noises. Examples of annoyance noises include the sounds of engines or motors, crying babies, and sirens. Commonly, annoyances noises are composed of a fundamental frequency component and harmonic components at multiples or harmonics of the fundamental frequency. The fundamental frequency may vary randomly or periodically, and the harmonic components may extend into the frequency range (e.g. 2000 Hz to 5000 Hz) where the human ear is most sensitive.

Throughout this description, elements appearing in figures are assigned three-digit reference designators, where the most significant digit is the figure number where the element is introduced and the two least significant digits are specific to the element. An element not described in conjunction with a figure has the same characteristics and function as a previously-described element having the same reference designator.

DETAILED DESCRIPTION

Figure 1:
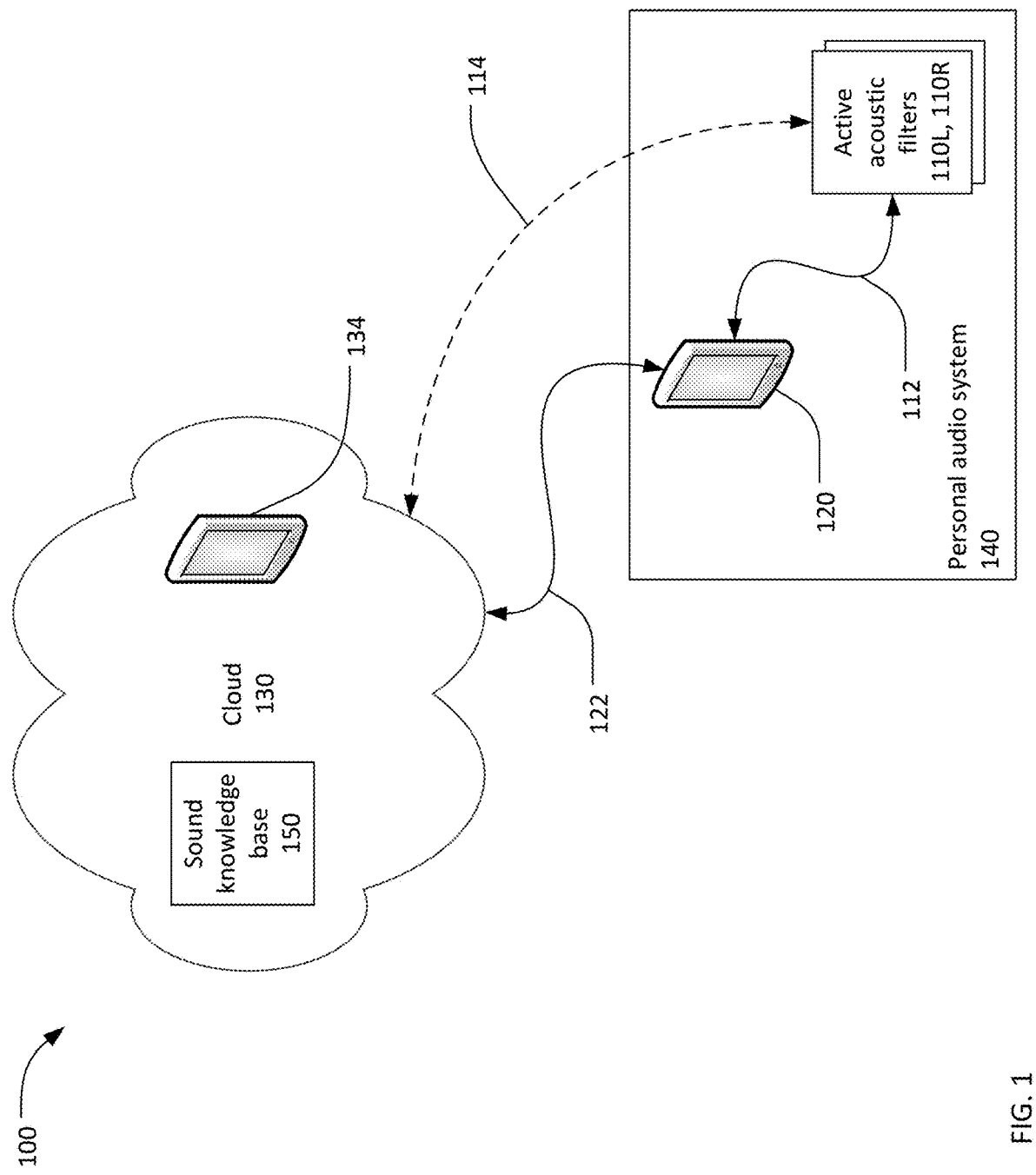
FIG. 1 is a block diagram of a sound processing system.

Referring now to FIG. 1, a sound processing system 100 may include at least one a personal audio system 140 and a sound knowledgebase 150 within a cloud 130. In this context, the term "cloud" means a network and all devices that may be accessed by the personal audio system 140 via the network. The cloud 130 may be a local area network, wide area network, a virtual network, or some other form of network together with all devices connected to the network. The cloud 130 may be or include the Internet. The devices within the cloud 130 may include, for example, one or more servers (not shown). The sound processing system 100 may include a large plurality of personal audio systems. The sound knowledgebase 150 will be subsequently described in the discussion of FIG. 9.

The personal audio system 140 includes left and right active acoustic filters 110L, 110R and a personal computing device 120. While the personal computing device 120 is shown in FIG. 1 as a smart phone, the personal computing device 120 may be a smart phone, a desktop computer, a mobile computer, a tablet computer, or any other computing device that is capable of performing the processes described herein. The personal computing device 120 may include one or more processors and memory configured to execute stored software instructions to perform the processes described herein. For example, the personal computing device 120 may run an application program or "app" to perform the functions described herein. The personal computing device 120 may include a user interface comprising a display and at least one input device such as a touch screen, microphone, keyboard, and/or mouse. The personal computing device 120 may be configured to perform geo-location, which is to say to determine its own location. Geo-location may be performed, for example, using a Global Positioning System (GPS) receiver or by some other method.

The active acoustic filters 110L, 110R may communicate with the personal computing device 120 via a first wireless communications link 112. While only a single first wireless communications link 112 is shown in FIG. 1, each active acoustic filter 110L, 110R may communicate with the personal computing device 120 via separate wireless communication links. The first wireless communications link 112 may use a limited-range wireless communications protocol such as Bluetooth®, WiFi®, ZigBee®, or some other wireless Personal Area Network (PAN) protocol. The personal computing device 120 may communicate with the cloud 130 via a second communications link 122. In particular, the personal computing device 120 may communicate with the sound knowledgebase 150 within the cloud 130 via the second communications link 122. The second communications link 122 may be a wired connection or may be a wireless communications link using, for example, the WiFi® wireless communications protocol, a mobile telephone data protocol, or another wireless communications protocol.

Optionally, the acoustic filters 110L, 110R may communicate directly with the cloud 130 via a third wireless communications link 114. The third wireless communications link 114 may be an alternative to, or in addition to, the first wireless communications link 112. The third wireless connection 114 may use, for example, the WiFi® wireless communications protocol, or another wireless communications protocol. The acoustic filters 110L, 110R may communicate with each other via a fourth wireless communications link (not shown).

Figure 2:
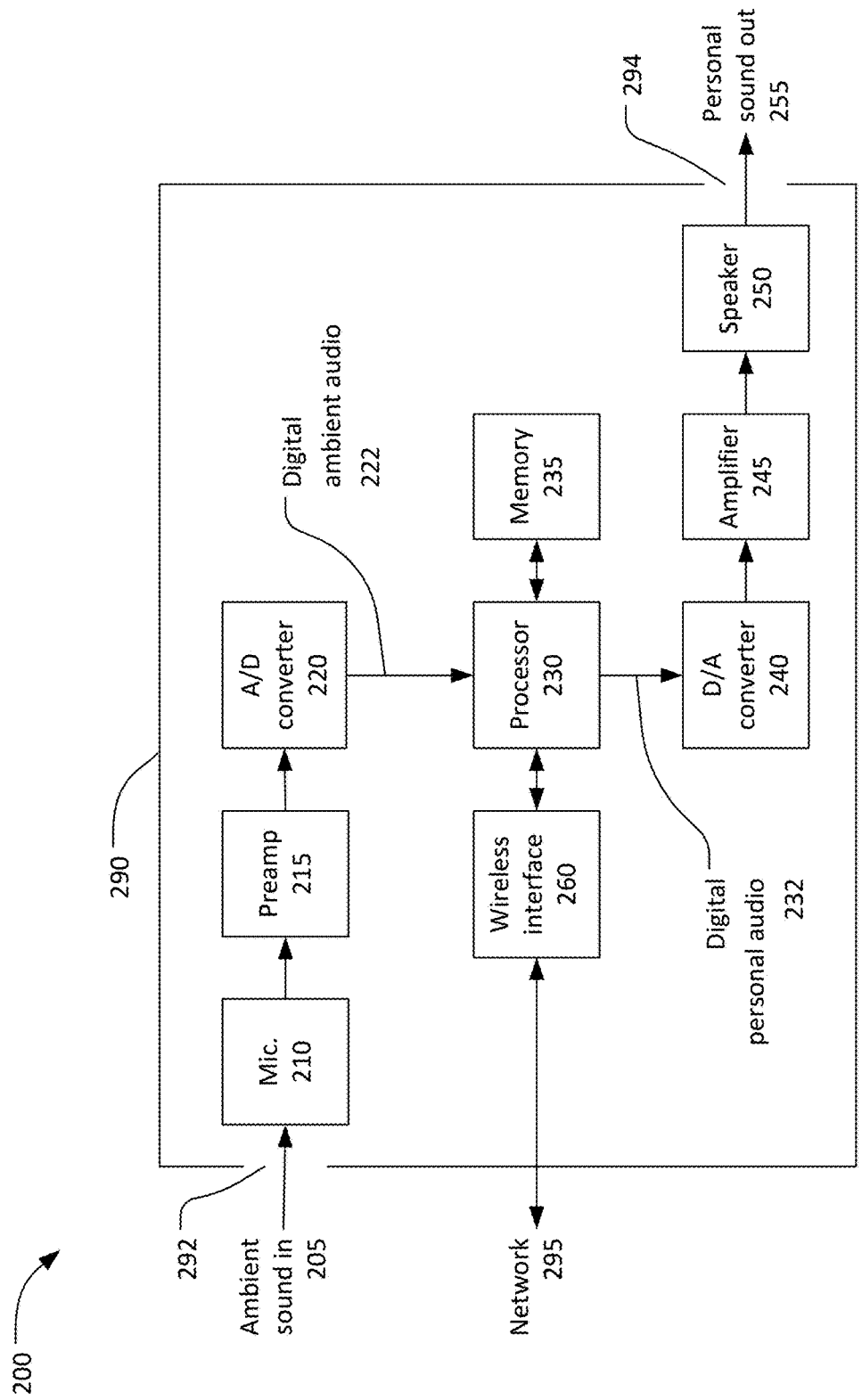
FIG. 2 is block diagram of an active acoustic filter.

FIG. 2 is block diagram of an active acoustic filter 200, which may be the active acoustic filter 110L and/or the active acoustic filter 110R. The active acoustic filter 200 may include a microphone 210, a preamplifier 215, an analog-to-digital (A/D) converter 220, a processor 230, a memory 235, an analog signal by digital-to-analog (D/A) converter 240, and amplifier 245, a speaker 250, a wireless interface 260, and a battery (not shown), all of which may be contained within a housing 290. The active acoustic filter 200 may receive ambient sound 205 and output personal sound 255. In this context, the term "sound" refers to acoustic waves propagating in air. "Personal sound" means sound that has been processed, modified, or tailored in accordance with a user's person preferences. The term "audio" refers to an electronic representation of sound, which may be an analog signal or a digital data.

The housing 290 may be configured to interface with a user's ear by fitting in, on, or over the user's ear such that ambient sound is mostly excluded from reaching the user's ear canal and processed personal sound generated by the active acoustic filter is provided directly into the user's ear canal. The housing 290 may have a first aperture 292 for accepting ambient sound and a second aperture 294 to allow the processed personal sound to be output into the user's outer ear canal. The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts ambient sound 205 into an electrical signal that is amplified by preamplifier 215 and converted into digital ambient audio 222 by A/D converter 220. In this context, the term "stream" means a sequence of digital samples. The "ambient audio stream" is a sequence of digital samples representing the ambient sound received by the active acoustic filter 200. The digital ambient audio 222 may be processed by processor 230 to provide digital personal audio 232. The processing performed by the processor 230 will be discussed in more detail subsequently. The digital personal audio 232 is converted into an analog signal by D/A converter 240. The analog signal output from D/A converter 240 is amplified by amplifier 245 and converted into personal sound 255 by speaker 250.

The depiction in FIG. 2 of the active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the processor 230, the memory 235, the analog signal by digital-to-analog (D/A) converter 240, the amplifier 245, and the wireless interface 260 may be contained within a common signal processor circuit device.

The microphone 210 may be one or more transducers for converting sound into an electrical signal that is sufficiently compact for use within the housing 290. The preamplifier 215 may be configured to amplify the electrical signal output from the microphone 210 to a level compatible with the input of the A/D converter 220. The preamplifier 215 may be integrated into the A/D converter 220, which, in turn, may be integrated with the processor 230. In the situation where the active acoustic filter 200 contains more than one microphone, a separate preamplifier may be provided for each microphone.

The A/D converter 220 may digitize the output from preamplifier 215, which is to say convert the output from preamplifier 215 into a series of digital ambient audio samples at a rate at least twice the highest frequency present in the ambient sound. For example, the A/D converter may output digital ambient audio 222 in the form of sequential audio samples at rate of 40 kHz or higher. The resolution of the digitized ambient audio 222 (i.e. the number of bits in each audio sample) may be sufficient to minimize or avoid audible sampling noise in the processed output sound 255. For example, the A/D converter 220 may output digital ambient audio 222 having 12 bits, 14, bits, or even higher resolution. In the situation where the active acoustic filter 200 contains more than one microphone with respective preamplifiers, the outputs from the preamplifiers may be digitized separately, or the outputs of some or all of the preamplifiers may be combined prior to digitization.

The processor 230 may include one or more processor devices such as a microcontroller, a microprocessor, and/or a digital signal processor. The processor 230 can include and/or be coupled to the memory 235. The memory 235 may store software programs, which may include an operating system, for execution by the processor 230. The memory 235 may also store data for use by the processor 230. The data stored in the memory 235 may include, for example, digital sound samples and intermediate results of processes performed on the digital ambient audio 222. The data stored in the memory 235 may also include a user's listening preferences, and/or rules and parameters for applying particular processes to convert the digital ambient audio 222 into the digital personal audio 232. The memory 235 may include a combination of read-only memory, flash memory, and static or dynamic random access memory.

The D/A converter 240 may convert the digital personal audio 232 from the processor 230 into an analog signal. The processor 230 may output the digital personal audio 232 as a series of samples typically, but not necessarily, at the same rate as the digital ambient audio 222 is generated by the A/D converter 220. The analog signal output from the D/A converter 240 may be amplified by the amplifier 245 and converted into personal sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

The wireless interface 260 may provide digital acoustic filter 200 with a connection to one or more wireless networks 295 using a limited-range wireless communications protocol such as Bluetooth®, WiFi®, ZigBee®, or other wireless personal area network protocol. The wireless interface 260 may be used to receive data such as parameters for use by the processor 230 in processing the digital ambient audio 222 to produce the digital personal audio 232. The wireless interface 260 may be used to receive a secondary audio feed. The wireless interface 260 may be used to export the digital personal audio 232, which is to say transmit the digital personal audio 232 to a device external to the active acoustic filter 200. The external device may then, for example, store and/or publish the digitized processed sound, for example via social media.

The battery (not shown) may provide power to various elements of the active acoustic filter 200. The battery may be, for example, a zinc-air battery, a lithium ion battery, a lithium polymer battery, a nickel cadmium battery, or a battery using some other technology.

The depiction in FIG. 2 of the active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the processor 230, the memory 235, the analog signal by digital-to-analog (D/A) converter 240, the amplifier 245, and the wireless interface 260 may be contained within a common signal processor circuit device.

Figure 3:
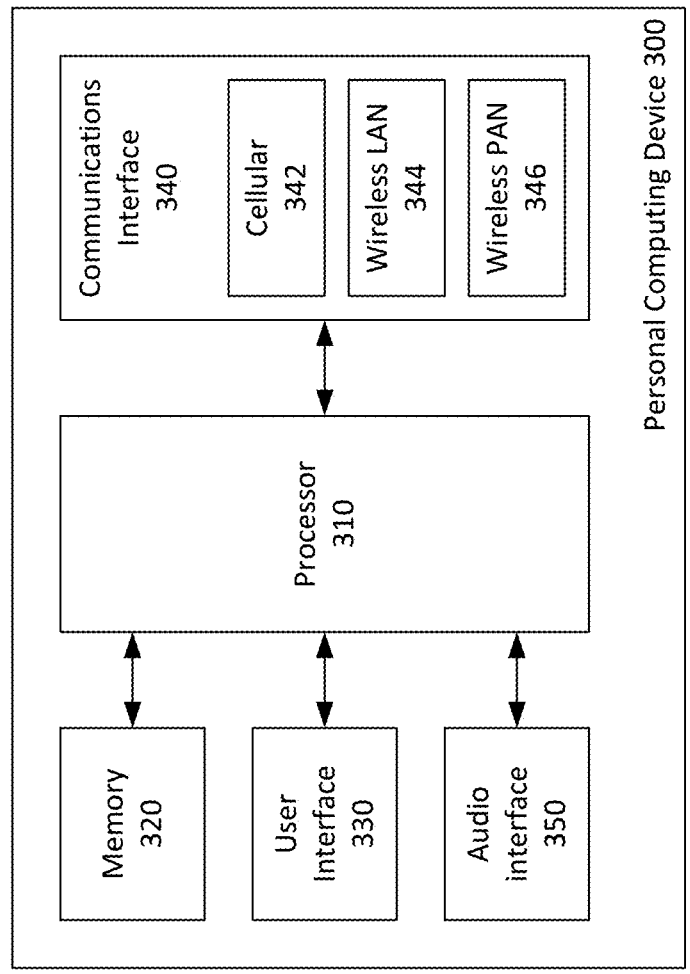
FIG. 3 is a block diagram of a personal computing device.

FIG. 3 is a block diagram of an exemplary personal computing device 300, which may be the personal computing device 120. As shown in FIG. 3, the personal computing device 300 includes a processor 310, memory 320, a user interface 330, a communications interface 340, and an audio interface 350. Some of these elements may or may not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 320 may store software programs and routines for execution by the processor. These stored software programs may include an operating system such as the Apple® or Android® operating systems. The operating system may include functions to support the communications interface 340, such as protocol stacks, coding/decoding, compression/decompression, and encryption/decryption. The stored software programs may include an application or "app" to cause the personal computing device to perform portions of the processes and functions described herein.

The user interface 330 may include a display and one or more input devices including a touch screen.

The communications interface 340 includes at least one interface for wireless communications with external devices. The communications interface 340 may include one or more of a cellular telephone network interface 342, a wireless Local Area Network (LAN) interface 344, and/or a wireless personal area network (PAN) interface 336. The cellular telephone network interface 342 may use one or more of the known 2G, 3G, and 4G cellular data protocols. The wireless LAN interface 344 may use the WiFi® wireless communications protocol or another wireless local area network protocol. The wireless PAN interface 346 may use a limited-range wireless communications protocol such as Bluetooth®, Wi-Fi®, ZigBee®, or some other public or proprietary wireless personal area network protocol. When the personal computing device is deployed as part of an personal audio system, such as the personal audio system 140, the wireless PAN interface 346 may be used to communicate with the active acoustic filter devices 110L, 110R. The cellular telephone network interface 342 and/or the wireless LAN interface 344 may be used to communicate with the cloud 130.

The communications interface 340 may include radio-frequency circuits, analog circuits, digital circuits, one or more antennas, and other hardware, firmware, and software necessary for communicating with external devices. The communications interface 340 may include one or more processors to perform functions such as coding/decoding, compression/decompression, and encryption/decryption as necessary for communicating with external devices using selected communications protocols. The communications interface 340 may rely on the processor 310 to perform some or all of these function in whole or in part.

The audio interface 350 may be configured to both input and output sound. The audio interface 350 may include more or more microphones, preamplifiers, and A/D converters that perform similar functions as the microphone 210, preamplifier 215, and A/D converter 220 of the active acoustic filter 200. The audio interface 350 may include more or more D/A converters, amplifiers, and speakers that perform similar functions as the D/A converter 240, amplifier 245, and speaker 250 of the active acoustic filter 200.

Figure 4:
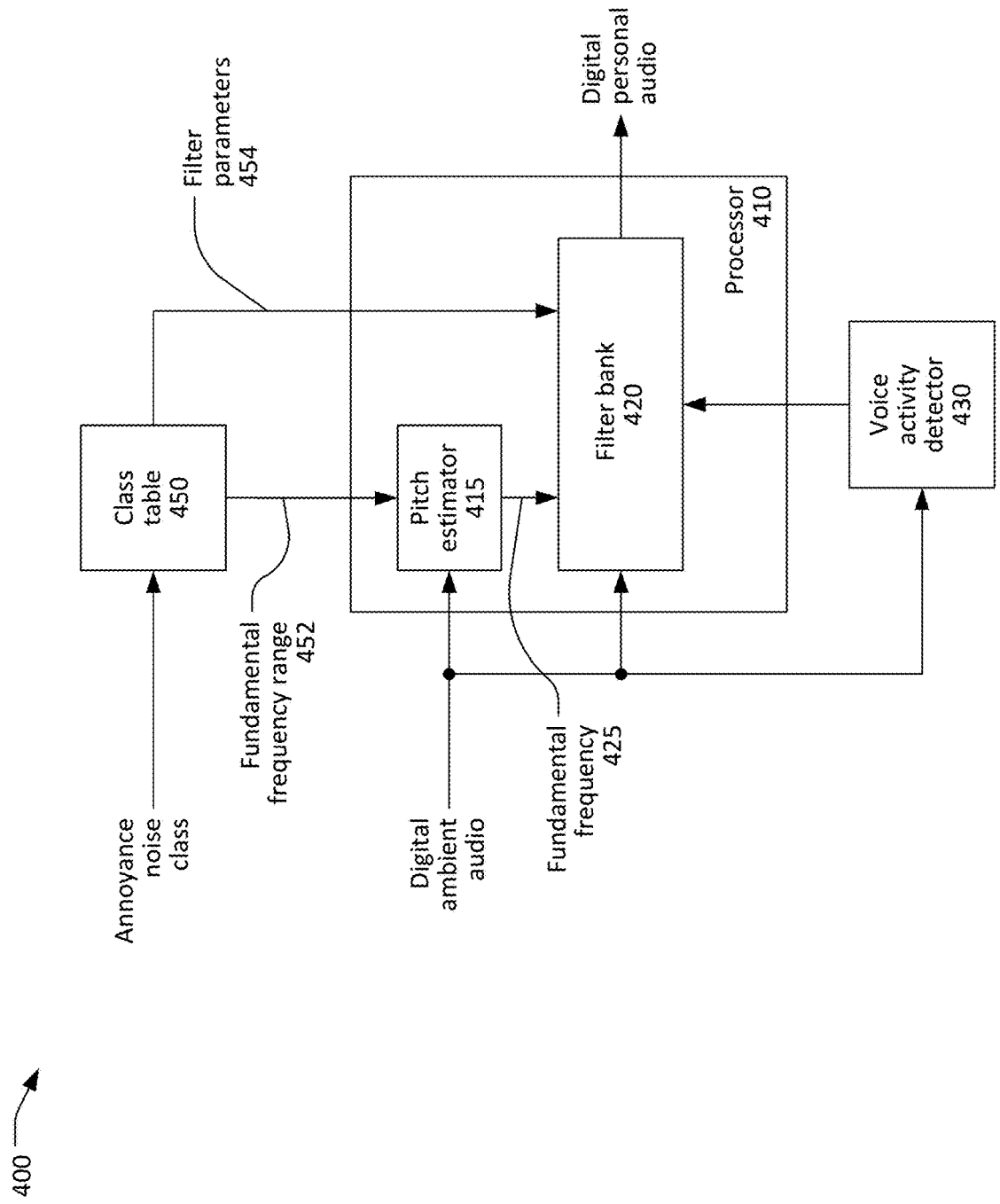
FIG. 4 is a functional block diagram of a portion of a personal audio system.

FIG. 4 shows a functional block diagram of a portion of an exemplary personal audio system 400, which may be the personal audio system 140. The personal audio system 400 may include one or two active acoustic filters, such as the active acoustic filters 110L, 110R, and a personal computing device, such as the personal computing device 120. The functional blocks shown in FIG. 4 may be implemented in hardware, by software running on one or more processors, or by a combination of hardware and software. The functional blocks shown in FIG. 4 may be implemented within the personal computing device or within one or both active acoustic filters, or may be distributed between the personal computing device and the active acoustic filters.

Techniques for improving a user's ability to hear conversation and other desirable sounds in the presence of an annoyance noise fall generally into two categories. First, the frequencies of the fundamental and harmonic components of the desirable sounds may be identified and accentuated using a set of narrow band-pass filters designed to pass those frequencies while rejecting other frequencies. However, the fundamental frequency of a typical human voice is highly modulated, which is to say changes in frequency rapidly during speech. Substantial computational and memory resources are necessary to track and band-pass filter speech. Alternatively, the frequencies of the fundamental and harmonic components of the annoyance noise may be identified and suppressed using a set of narrow band-reject filters designed to attenuate those frequencies while passing other frequencies (presumably including the frequencies of the desirable sounds). Since the fundamental frequency of many annoyance noises (e.g. sirens and machinery sounds) may vary slowly and/or predictably, the computational resources required to track and filter an annoyance noise may be lower than the resources needed to track and filter speech.

The personal audio system 400 includes a processor 410 that receives a digital ambient audio stream, such as the digital ambient audio 222. In this context, the term "stream" means a sequence of digital samples. The "ambient audio stream" is a sequence of digital samples representing the ambient sound received by the personal audio system 400. The processor 410 includes a filter bank 420 including two or more band reject filters to attenuate or suppress a fundamental frequency component and at least one harmonic component of the fundamental frequency of an annoyance noise included in the digital ambient audio stream. Typically, the filter bank 420 may suppress the fundamental component and multiple harmonic components of the annoyance noise. The processor 410 outputs a digital personal audio stream, which may be the digital personal audio 232, in which the fundamental component and at least some harmonic components of the annoyance noise are suppressed compared with the ambient audio stream. Components of the digital ambient audio at frequencies other than the fundamental and harmonic frequencies of the annoyance noise may be incorporated into the digital personal audio stream with little or no attenuation.

The processor 410 may be or include one or more microprocessors, microcontrollers, digital signal processors, application specific integrated circuits (ASICs), or a system-on-a-chip (SOCs). The processor 410 may be located within an active acoustic filter, within the personal computing device, or may be distributed between a personal computing device and one or two active acoustic filters.

The processor 410 includes a pitch estimator 415 to identify and track the fundamental frequency of the annoyance noise included in the digital ambient audio stream. Pitch detection or estimation may be performed by time-domain analysis of the digital ambient audio, by frequency-domain analysis of the digital ambient audio, or by a combination of time-domain and frequency-domain techniques. Known pitch detection techniques range from simply measuring the period between zero-crossings of the digital ambient audio in the time domain, to complex frequency-domain analysis such as harmonic product spectrum or cepstral analysis. Brief summaries of known pitch detection methods are provided by Rani and Jain in "A Review of Diverse Pitch Detection Methods," International Journal of Science and Research, Vol. 4 No. 3, March 2015. One or more known or future pitch detection technique may be used in the pitch estimator 415 to estimate and track the fundamental frequency of the digital ambient audio stream.

The pitch estimator 415 may output a fundamental frequency value 425 to the filter bank 420. The filter bank 420 may use the fundamental frequency value 425 to "tune" its band reject filters to attenuate or suppress the fundamental component and the at least one harmonic component of the annoyance noise. A band reject filter is considered tuned to a particular frequency of the rejection band of the filter is center on, or nearly centered on the particular frequency. Techniques for implementing and tuning digital narrow band reject filters or notch filters are known in the art of signal processing. For example, an overview of narrow band reject filter design and an extensive list of references are provided by Wang and Kundur in "A generalized design framework for IIR digital multiple notch filters," EURASIP Journal on Advances in Signal Processing, 2015:26, 2015.

The fundamental frequency of many common annoyance noise sources, such as sirens and some machinery noises, is higher than the fundamental frequencies of human speech. For example, the fundamental frequency of human speech typically falls between 85 Hz and 300 Hz. The fundamental frequency of some women's and children's voices may be up to 500 Hz. In comparison, the fundamental frequency of emergency sirens typically falls between 450 Hz and 800 Hz. Of course, the human voice contains harmonic components which give each person's voice a particular timbre or tonal quality. These harmonic components are important both for recognition of a particular speaker's voice and for speech comprehension. Since the harmonic components within a particular voice may overlap the fundamental component and lower-order harmonic components of an annoyance noise, it may not be practical or even possible to substantially suppress an annoyance noise without degrading speaker and/or speech recognition.

The personal audio system 400 may include a voice activity detector 430 to determine if the digital ambient audio stream contains speech in addition to an annoyance noise. Voice activity detection is an integral part of many voice-activated systems and applications. Numerous voice activity detection methods are known, which differ in latency, accuracy, and computational resource requirements. For example, a particular voice activity detection method and references to other known voice activity detection techniques is provided by Faris, Mozaffarian, and Rahmani in "Improving Voice Activity Detection Used in ITU-T G.729.B," Proceedings of the $3^{rd}$ WSEAS Conference on Circuits, Systems, Signals, and Telecommunications, 2009. The voice activity detector 430 may use one of the known voice activity detection techniques, a future developed activity detection technique, or a proprietary technique optimized to detection voice activity in the presence of annoyance noises.

When voice activity is not detected, the processor 410 may implement a first bank of band-reject filters 420 intended to substantially suppress the fundamental component and/or harmonic components of an annoyance noise. When voice activity is detected (i.e. when both an annoyance noise and speech are present in the digital ambient audio), the tracking noise suppression filter 410 may implement a second bank of band-reject filters 420 that is a compromise between annoyance noise suppression and speaker/speech recognition.

Figure 5:
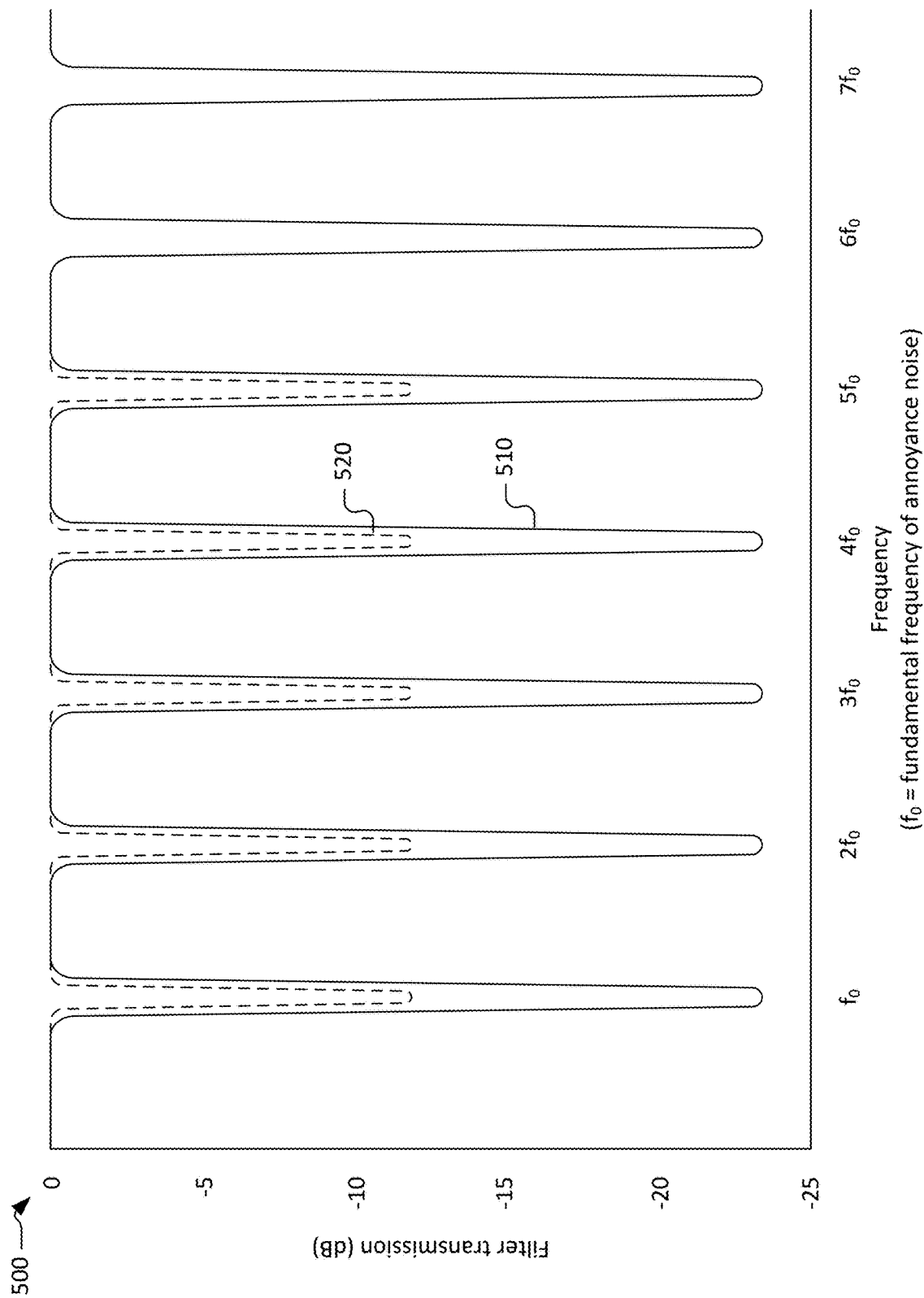
FIG. 5 is a graph showing characteristics of an annoyance noise suppression filter and a compromise noise/voice filter.

FIG. 5 shows a graph 500 showing the throughput of an exemplary processor, which may be the processor 410. When voice activity is not detected, the exemplary processor implements a first filter function, indicated by the solid line 510, intended to substantially suppress the annoyance noise. In this example, the first filter function includes a first bank of seven band reject filters providing about 24 dB attenuation at the fundamental frequency $f_0$ and first six harmonics ($2f_0$ through $7f_0$) of an annoyance noise. The choice of 24 dB attenuation, the illustrated filter bandwidth, and six harmonics are exemplary and a tracking noise suppression filter may provide more or less attenuation and/or more or less filter bandwidth for greater or fewer harmonics. When voice activity is detected (i.e. when both an annoyance noise and speech are present in the digital ambient audio), the exemplary processor implements a second filter function, indicated by the dashed line 520, that is a compromise between annoyance noise suppression and speaker/speech recognition. In this example, the second filter function includes a second bank of band reject filters with lower attenuation and narrower bandwidth at the fundamental frequency and first four harmonics of the annoyance noise. The characteristics of the first and second filter functions are the same at the fifth and sixth harmonic (where the solid line 510 and dashed line 520 are superimposed).

The difference between the first and second filter functions in the graph 500 is also exemplary. In general, a processor may implement a first filter function when voice activity is not detected and a second filter function when both an annoyance noise and voice activity are present in the digital audio stream. The second filter function may provide less attenuation (in the form of lower peak attenuation, narrower bandwidth, or both) than the first filter function for the fundamental component of the annoyance noise. The second filter function may also provide less attenuation than the first filter function for one or more harmonic components of the annoyance noise. The second filter function may provide less attenuation than the first filter function for a predetermined number of harmonic components. In the example of FIG. 5, the second filter function provides less attenuation than the first filter function for the fundamental frequency and the first four lowest-order harmonic components of the fundamental frequency of the annoyance noise. The second filter function may provide less attenuation than the first filter function for harmonic components having frequencies less than a predetermined frequency value. For example, since the human ear is most sensitive to sound frequencies from 2 kHz to 5 kHz, the second filter function may provide less attenuation than the first filter function for harmonic components having frequencies less 2 kHz.

Referring back to FIG. 4, the computational resources and latency time required for the processor 410 to estimate the fundamental frequency and start filtering the annoyance noise may be reduced if parameters of the annoyance noise are known. To this end, the personal audio system 400 may include a class table 450 that lists a plurality of known classes of annoyance noises and corresponding parameters. Techniques for identifying a class of an annoyance noise will be discussed subsequently. Once the annoyance noise class is identified, parameters of the annoyance noise may be retrieved from the corresponding entry in the class table 450.

For example, a parameter that may be retrieved from the class table 450 and provided to the pitch estimator 415 is a fundamental frequency range 452 of the annoyance noise class. Knowing the fundamental frequency range 452 of the annoyance noise class may greatly simplify the problem of identifying and tracking the fundamental frequency of a particular annoyance noise within that class. For example, the pitch estimator 415 may be constrained to find the fundamental frequency within the fundamental frequency range 452 retrieved from the class table 450. Other information that may be retrieved from the class table 450 and provided to the pitch estimator 415 may include an anticipated frequency modulation scheme or a maximum expected rate of change of the fundamental frequency for the identified annoyance noise class. Further, one or more filter parameters 454 may be retrieved from the class table 450 and provided to the filter bank 420. Examples of filter parameters that may be retrieved from the class table 450 for a particular annoyance noise class include a number of harmonics to be filtered, a specified Q (quality factor) of one or more filters, a specified bandwidth of one or more filters, a number of harmonics to be filtered differently by the first and second filter functions implemented by the filer bank 420, expected relative amplitudes of harmonics, and other parameters. The filter parameters 454 may be used to tailor the characteristics of the filter bank 420 to the identified annoyance noise class.

Figure 6:
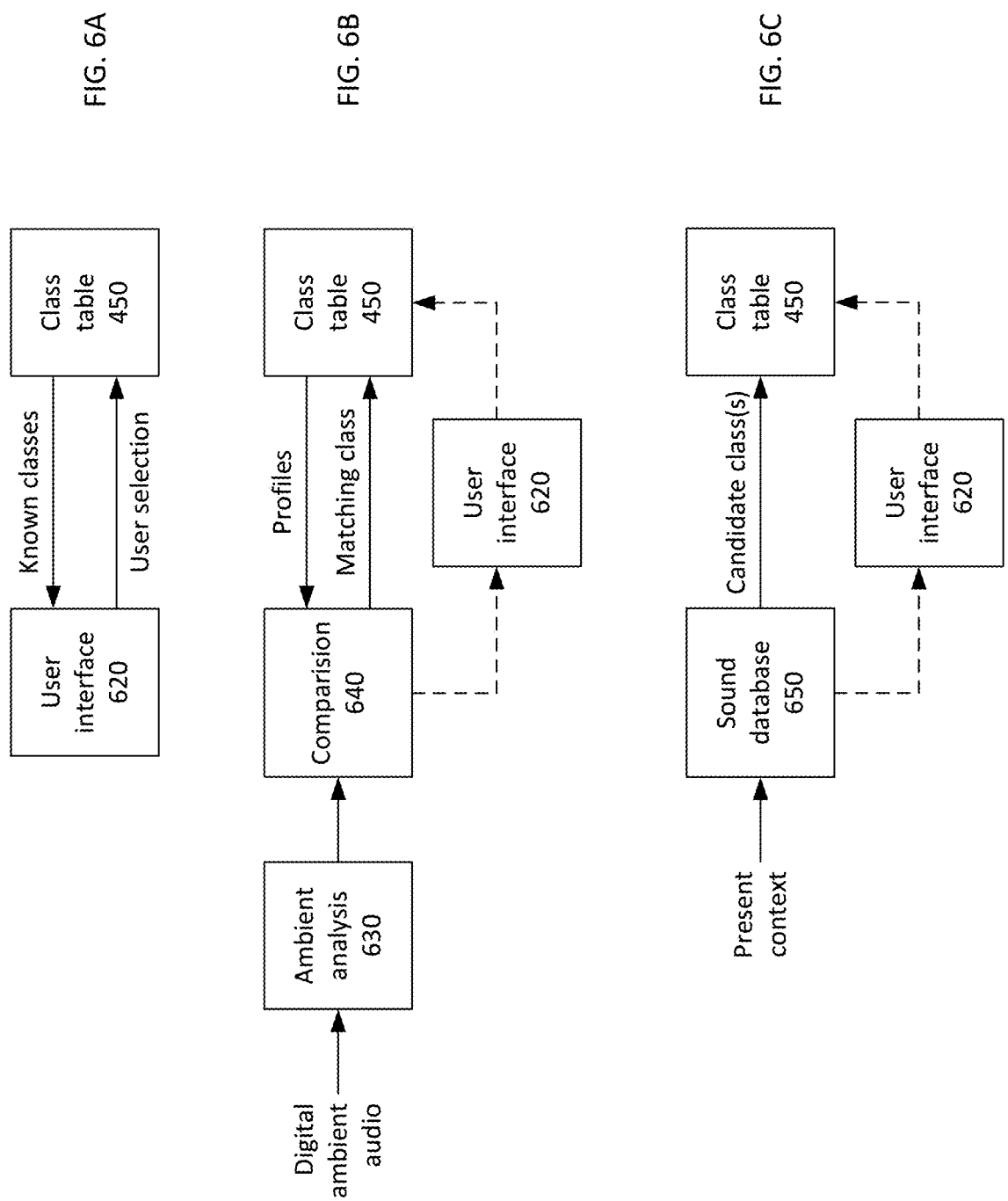
FIG. 6A, FIG. 6B, and FIG. 6C are functional block diagrams of systems for identifying a class of an annoyance noise source.

A number of different systems and associated methods may be used to identify a class of an annoyance noise. The annoyance class may be manually selected by the user of a personal audio system. As shown in FIG. 6A, the class table 450 from the personal audio system 400 may include a name or other identifier (e.g. siren, baby crying, airplane flight, etc.) associated with each known annoyance noise class. The names may be presented to the user via a user interface 620, which may be a user interface of a personal computing device. The user may select one of the names using, for example, a touch screen portion of the user interface. Characteristics of the selected annoyance noise class may then be retrieved from the class table 450.

The annoyance class may be selected automatically based on analysis of the digital ambient audio. In this context, "automatically" means without user intervention. As shown in FIG. 6B, the class table 450 from the personal audio system 400 may include a profile of each known annoyance noise class. Each stored annoyance noise class profile may include characteristics such as, for example, an overall loudness level, the normalized or absolute loudness of predetermined frequency bands, the spectral envelop shape, spectrographic features such as rising or falling pitch, the presence and normalized or absolute loudness of dominant narrow-band sounds, the presence or absence of odd and/or even harmonics, the presence and normalized or absolute loudness of noise, low frequency periodicity, and other characteristics. An ambient sound analysis function 630 may develop a corresponding ambient sound profile from the digital ambient audio stream. A comparison function 640 may compare the ambient sound profile from 630 with each of the known annoyance class profiles from the class table 450. The known annoyance class profile that best matches the ambient sound profile may be identified. Characteristics of the corresponding annoyance noise class may then be automatically, meaning without human intervention, retrieved from the class table 450 to be used by the tracking noise suppression filter 410. Optionally, as indicated by the dashed lines, the annoyance noise class automatically identified at 640 may be presented on the user interface 620 for user approval before the characteristics of the corresponding annoyance noise class are retrieved and used to configure the tracking noise suppression filter.

The annoyance noise class may be identified based, at least in part, on a context of the user. As shown in FIG. 6C, a sound database 650 may store data indicating typical or likely sounds as a function of context, where "context" may include parameters such as physical location, user activity, date, and/or time of day. For example, for a user located proximate to a fire station or hospital, a likely or frequent annoyance noise may be "siren". For a user located near the end of an airport runway, the most likely annoyance noise class may be "jet engine" during the operating hours of the airport, but "siren" during times when the airport is closed. In an urban area, the prevalent annoyance noise may be "traffic".

The sound database 650 may be stored in memory within the personal computing device. The sound database 650 may be located within the cloud 130 and accessed via a wireless connection between the personal computing device and the cloud. The sound database 650 may be distributed between the personal computing device and the cloud 130.

A present context of the user may be used to access the sound database 650. For example, data indicating current user location, user activity, date, time, and/or other contextual information may be used to access the sound database 650 to retrieve one or more candidate annoyance noise classes. Characteristics of the corresponding annoyance noise class or classes may then be retrieved from the class table 450. Optionally, as indicated by the dashed lines, the candidate annoyance noise class(es) may be presented on the user interface 620 for user approval before the characteristics of the corresponding annoyance noise class are retrieved from the class table 450 and used to configure the tracking noise suppression filter 410.

The systems shown in FIG. 6A, FIG. 6B, and FIG. 6C and the associated methods are not mutually exclusive. One or more of these techniques and other techniques may be used sequentially or concurrently to identify the class of an annoyance noise.

Figure 7:
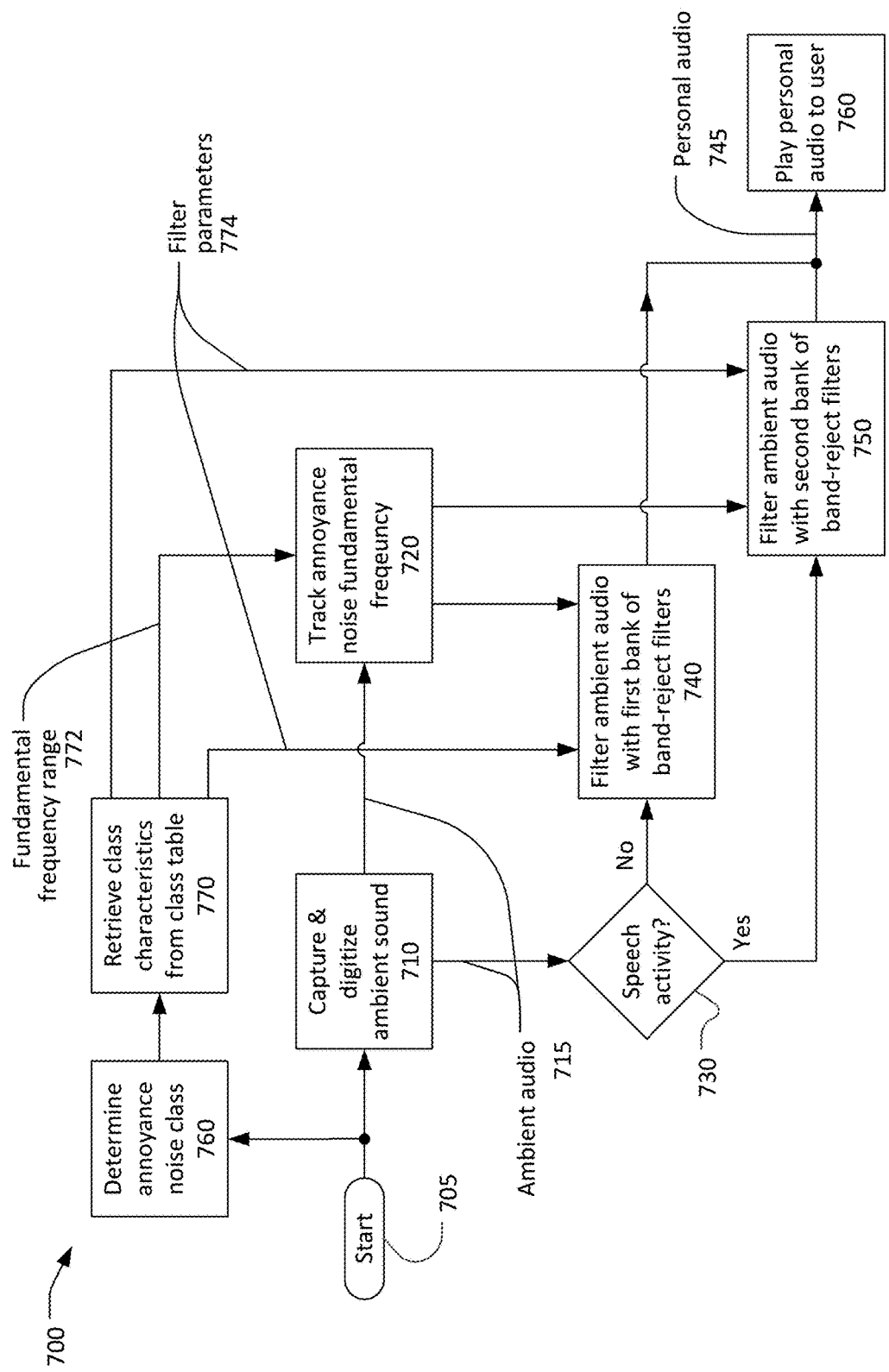
FIG. 7 is a flow chart of a method for suppressing an annoyance noise.

Referring now to FIG. 7, a method 700 for suppressing an annoyance noise in an audio stream may start at 705 and proceed continuously until stopped by a user action (not shown). The method 700 may be performed by a personal audio system, such as the personal audio system 140, which may include one or two active acoustic filters, such as the active acoustic filters 110L, 110R, and a personal computing device, such as the personal computing device 120. All or portions of the method 700 may be performed by hardware, by software running on one or more processors, or by a combination of hardware and software. Although shown as a series of sequential actions for ease of discussion, it must be understood that the actions from 710 to 760 may occur continuously and simultaneously.

At 710 ambient sound may be captured and digitized to provide an ambient audio stream 715. For example, the ambient sound may be converted into an analog signal by the microphone 210, amplified by the preamplifier 215, and digitized by the A/D converter 220 as previously described.

At 720, a fundamental frequency or pitch of an annoyance noise contained in the ambient audio stream 715 may be detected and tracked. Pitch detection or estimation may be performed by time-domain analysis of the ambient audio stream, by frequency-domain analysis of the ambient audio stream, or by a combination of time-domain and frequency-domain techniques. Known pitch detection techniques range from simply measuring the period between zero-crossings of the ambient audio stream in the time domain, to complex frequency-domain analysis such as harmonic product spectrum or cepstral analysis. One or more known, proprietary, or future-developed pitch detection techniques may be used at 720 to estimate and track the fundamental frequency of the ambient audio stream.

At 730, a determination may be made whether or not the ambient audio stream 715 contains speech in addition to an annoyance noise. Voice activity detection is an integral part of many voice-activated systems and applications. Numerous voice activity detection methods are known, as previously described. One or more known voice activity detection techniques or a proprietary technique optimized for detection voice activity in the presence of annoyance noises may be used to make the determination at 730.

When a determination is made at 730 that the ambient audio stream does not contain voice activity ("no" at 730), the ambient audio stream may be filtered at 740 using a first bank of band-reject filters intended to substantially suppress the annoyance noise. The first bank of band-reject filters may include band-reject filters to attenuate a fundamental component (i.e. a component at the fundamental frequency determined at 720) and one or more harmonic components of the annoyance noise.

The personal audio stream 745 output from 740 may be played to a user at 760. For example, the personal audio stream 745 may be converted to an analog signal by the D/A converter 240, amplified by the amplifier 245, and converter to sound waves by the speaker 250 as previously described.

When a determination is made at 730 that the ambient audio stream does contain voice activity ("yes" at 730), the ambient audio stream may be filtered at 750 using a second bank of band-reject filters that is a compromise between annoyance noise suppression and speaker/speech recognition. The second bank of band-reject filters may include band-reject filters to attenuate a fundamental component (i.e. a component at the fundamental frequency determined at 720) and one or more harmonic components of the annoyance noise. The personal audio stream 745 output from the 750 may be played to a user at 760 as previously described.

The filtering performed at 750 using the second bank of band-reject filters may provide less attenuation (in the form of lower peak attenuation, narrower bandwidth, or both) than the filtering performed at 740 using first bank of band-reject filters for the fundamental component of the annoyance noise. The second bank of band-reject filters may also provide less attenuation than the first bank of band-reject filters for one or more harmonic components of the annoyance noise. The second bank of band-reject filters may provide less attenuation than the first bank of band-reject filters for a predetermined number of harmonic components. As shown in the example of FIG. 5, the second bank of band-reject filters provides less attenuation than the first bank of band-reject filters for the fundamental frequency and the first four lowest-order harmonic components of the fundamental frequency of the annoyance noise. The second bank of band-reject filters may provide less attenuation than the first bank of band-reject filters for harmonic components having frequencies less than a predetermined frequency value. For example, since the human ear is most sensitive to sound frequencies from 2 kHz to 5 kHz, the second bank of band-reject filters may provide less attenuation than the first bank of band-reject filters for harmonic components having frequencies less than or equal to 2 kHz.

The computational resources and latency time required to initially estimate the fundamental frequency at 720 and to start filtering the annoyance noise at 740 or 750 may be reduced if one or more characteristics of the annoyance noise are known. To this end, a personal audio system may include a class table that lists known classes of annoyance noises and corresponding characteristics.

An annoyance noise class of the annoyance noise included in the ambient audio stream may be determined at 760. Exemplary methods for determining an annoyance noise class were previously described in conjunction with FIG. 6A, FIG. 6B, and FIG. 6C. Descriptions of these methods will not be repeated. These and other methods for identifying the annoyance noise class may be used at 760.

Characteristics of the annoyance noise class identified at 760 may retrieved from the class table at 770. For example, a fundamental frequency range 772 of the annoyance noise class may be retrieved from the class table at 770 and used to facilitate tracking the annoyance noise fundamental frequency at 720. Knowing the fundamental frequency range 772 of the annoyance noise class may greatly simplify the problem of identifying and tracking the fundamental frequency of a particular annoyance noise. Other information that may be retrieved from the class table at 770 and used to facilitate tracking the annoyance noise fundamental frequency at 720 may include an anticipated frequency modulation scheme or a maximum expected rate of change of the fundamental frequency for the identified annoyance noise class.

Further, one or more filter parameters 774 may be retrieved from the class table 450 and used to configure the first and/or second banks of band-reject filters used at 740 and 750. Filter parameters that may be retrieved from the class table at 770 may include a number of harmonic components to be filtered, a number of harmonics to be filtered differently by the first and second bank of band-reject filters, expected relative amplitudes of harmonic components, and other parameters. Such parameters may be used to tailor the characteristics of the first and/or second banks of band-reject filters used at 740 and 750 for the identified annoyance noise class.

Figure 8:
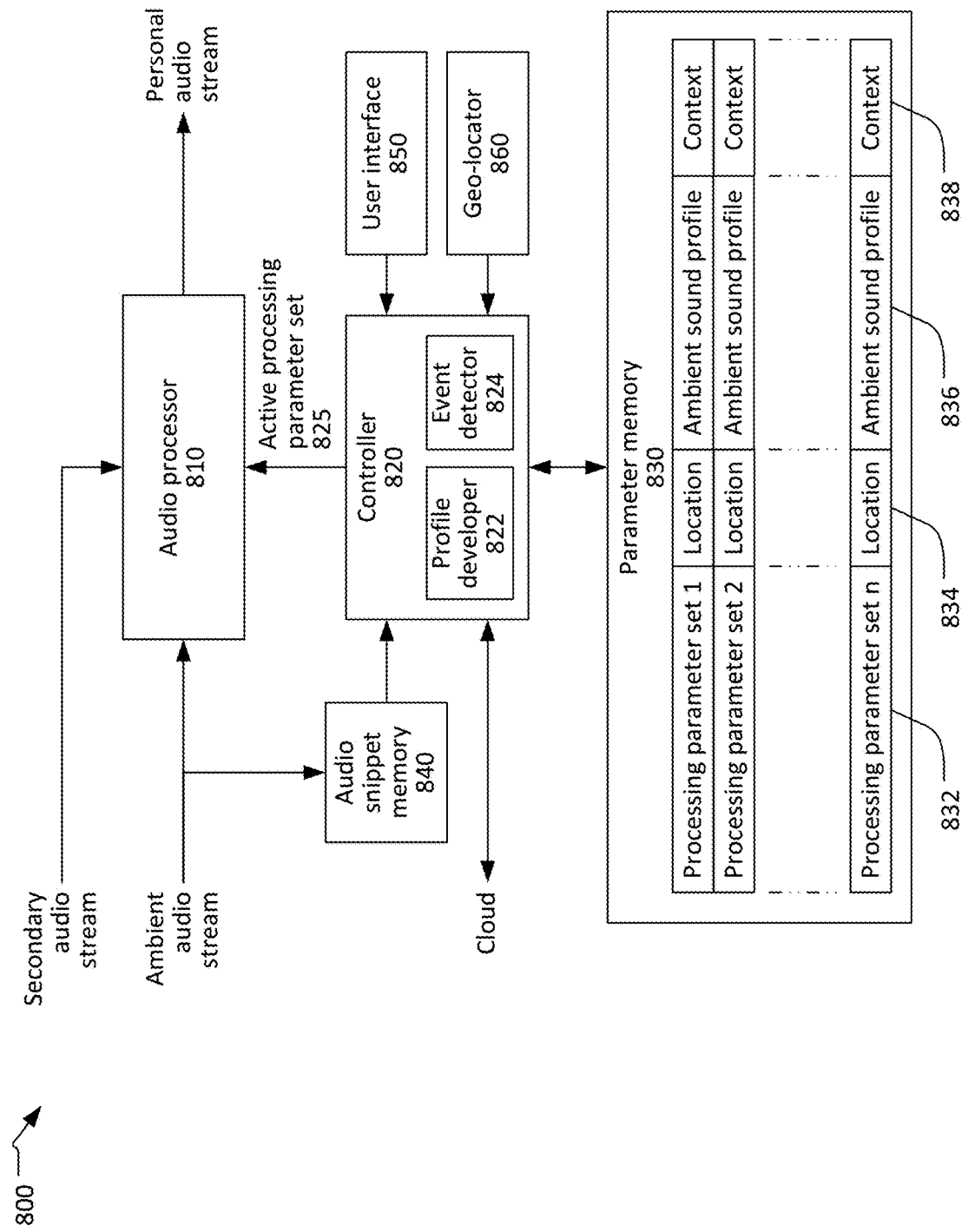
FIG. 8 is a functional block of a portion of a personal audio system.

FIG. 8 shows a functional block diagram of a portion of an exemplary personal audio system 800, which may be the personal audio system 140. The personal audio system 800 may include one or two active acoustic filters, such as the active acoustic filters 110L, 110R, and a personal computing device, such as the personal computing device 120. The functional blocks shown in FIG. 8 may be implemented in hardware, by software running on one or more processors, or by a combination of hardware and software. The functional blocks shown in FIG. 8 may be implemented within the personal computing device, or within one or both active acoustic filters, or may be distributed between the personal computing device and the active acoustic filters.

The personal audio system 800 includes an audio processor 810, a controller 820, a dataset memory 830, an audio snippet memory 840, a user interface 850, and a geo-locator 860. The audio processor 810 and/or the controller 820 may include additional memory, which is not shown, for storing program instructions, intermediate results, and other data.

The audio processor 810 may be or include one or more microprocessors, microcontrollers, digital signal processors, application specific integrated circuits (ASICs), or a system-on-a-chip (SOCs). The audio processor 810 may be located within an active acoustic filter, within the personal computing device, or may be distributed between a personal computing device and one or two active acoustic filters.

The audio processor 810 receives and processes a digital ambient audio stream, such as the digital ambient audio 222, to provide a personal audio stream, such as the digital personal audio 232. The audio processor 810 may perform processes including filtering, equalization, compression, limiting, and/or other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount. Techniques for implementing filters, limiters, compressors, and limiters are known to those of skill in the art of digital signal processing.

The audio processor 810 may also add echo or reverberation to the ambient audio stream. The audio processor 810 may also detect and cancel an echo in the ambient audio stream. The audio processor 810 may further perform noise reduction processing. Techniques to add or suppress echo, to add reverberation, and to reduce noise are known to those of skill in the art of digital signal processing.

The audio processor may receive a secondary audio stream. The audio processor may incorporate the secondary audio stream into the personal audio stream. For example, the secondary audio stream may be added to the ambient audio stream before processing, after all processing of the ambient audio stream is performed, or at an intermediate stage in the processing of the ambient audio stream. The secondary audio stream may not be processed, or may be processed in the same manner as or in a different manner than the ambient audio stream.

The audio processor 810 may process the ambient audio stream, and optionally the secondary audio stream, in accordance with an active processing parameter set 825. The active processing parameter set 825 may define the type and degree of one or more processes to be performed on the ambient audio stream and, when desired, the secondary audio stream. The active processing parameter set may include numerical parameters, filter models, software instructions, and other information and data to cause the audio processor to perform desired processes on the ambient audio stream. The extent and format of the information and data within active processing parameter set 825 may vary depending on the type of processing to be performed. For example, the active processing parameter set 825 may define filtering by a low pass filter with a particular cut-off frequency (the frequency at which the filter start to attenuate) and slope (the rate of change of attenuation with frequency) and/or compression using a particular function (e.g. logarithmic). For further example, the active processing parameter set 825 may define the plurality of frequency bands for equalization and provide a respective attenuation or gain for each frequency band. In yet another example, the processing parameters may define a delay time and relative amplitude of an echo to be added to the digitized ambient sound.

The audio processor 810 may receive the active processing parameter set 825 from the controller 820. The controller 820, in turn, may obtain the active processing parameter set 825 from the user via the user interface 850, from the cloud (e.g. from the sound knowledgebase 150 or another device within the cloud), or from a parameter memory 830 within the personal audio system 800.

The parameter memory 830 may store one or more processing parameter sets 832, which may include a copy of the active processing parameter set 825. The parameter memory 830 may store dozens or hundreds or an even larger number of processing parameter sets 832. Each processing parameter set 832 may be associated with at least one indicator, where an "indicator" is data indicating conditions or circumstances where the associated processing parameter set 832 is appropriate for selection as the active processing parameter set 825. The indicators associated with each processing parameter set 832 may include one or more of a location 834, an ambient sound profile 836, and a context 838.

Locations 834 may be associated with none, some, or all of the processing parameter sets 832 and stored in the parameter memory 830. Each location 834 defines a geographic position or limited geographic area where the associated set of processing parameters 832 is appropriate. A geographic position may be defined, for example, by a street address, longitude and latitude coordinates, GPS coordinates, or in some other manner. A geographic position may include fine-grained information such as a floor or room number in a building. A limited geographic area may be defined, for example, by a center point and a radius, by a pair of coordinates identifying diagonal corners of a rectangular area, by a series of coordinates identifying vertices of a polygon, or in some other manner.

Ambient sound profiles 836 may be associated with none, some, or all of the processing parameter sets 832 and stored in the parameter memory 830. Each ambient sound profile 836 defines an ambient sound environment in which the associated processing parameter set 832 is appropriate. Each ambient sound profile 836 may define the ambient sound environment by a finite number of numerical values. For example, an ambient profile may include numerical values for some or all of an overall loudness level, a normalized or absolute loudness of predetermined frequency bands, a spectral envelop shape, spectrographic features such as rising or falling pitch, frequencies and normalized or absolute loudness levels of dominant narrow-band sounds, an indicator of the presence or absence of odd and/or even harmonics, a normalized or absolute loudness of noise, a low frequency periodicity (e.g. the "beat" when the ambient sound includes music), and numerical values quantifying other characteristics.

Contexts 838 may be associated with none, some, or all of the processing parameter sets 832 and stored in the parameter memory 830. Each context 838 names an environment or situation in which the associated processing parameter set 832 is appropriate. A context may be considered as the name of the associated processing parameter set. Examples of contexts include "airplane cabin," "subway," "urban street," "siren," and "crying baby." A context is not necessarily associated with a specific geographic location, but may be associated with a generic location such as, for example, "airplane," "subway," and "urban street." A context may be associated with a type of ambient sound such as, for example, "siren," "crying baby," and "rock concert." A context may be associated with one or more sets of processing parameters. When a context is associated with multiple processing parameter sets 832, selection of a particular processing parameter set may be based on location or ambient sound profile. For example, "siren" may be associated with a first set of processing parameters for locations in the United States and a different set of processing parameters for locations in Europe.

The controller 820 may select a parameter set 832 for use as the active processing parameter set 825 based on location, ambient sound profile, context, or a combination thereof. Retrieval of a processing parameter set may be requested by the user via a user interface 850. Alternatively or additionally, retrieval of a processing parameter set may be initiated automatically by the controller 820. For example, the controller 820 may include a profile developer 822 to analyze the ambient audio stream to develop a current ambient sound profile. The controller 820 may compare the current ambient sound profile with a stored prior ambient sound profile. When the current ambient sound profile is judged, according to first predetermined criteria, to be substantially different from the prior ambient sound profile, the controller 820 may initiate retrieval of a new set of processing parameters.

The personal audio system 800 may contain a geo-locator 860. The geo-locator 860 may determine a geographic location of the personal audio system 800 using GPS, cell tower triangulation, or some other method. As described in co-pending patent application Ser. No. 14/681,843, entitled "Active Acoustic Filter with Location-Based Filter Characteristics," the controller 820 may compare the geographic location of the personal audio system 800, as determined by the geo-location 860, with location indicators 834 stored in the parameter memory 830. When one of the location indicators 834 matches, according to second predetermined criteria the geographic location of the personal audio system 800, the associated processing parameter set 832 may be retrieved and provided to the audio processor 810 as the active processing parameter set 825.

As described in co-pending patent application Ser. No. 14/819,298, entitled "Active Acoustic Filter with Automatic Selection of Filter Parameters Based on Ambient Sound," the controller may select a set of processing parameters based on the ambient sound. The controller 820 may compare the profile of the ambient sound, as determined by the profile developer 822, with profile indicators 836 stored in the parameter memory 830. When one of the profile indicators 836 matches, according to third predetermined criteria, the profile of the ambient sound, the associated processing parameter set 832 may be retrieved and provided to the audio processor 810 as the active processing parameter set 825.

In some circumstances, for example upon user request or when a matching location or profile is not found in the parameter memory 830, the controller may present a list of the contexts 838 on a user interface 850. A user may then manually select one of the listed contexts and the associated processing parameter set 832 may be retrieved and provided to the audio processor 810 as the active processing parameter set 825. For example, assuming the user interface includes a display with a touch screen, the list of contexts may be displayed on the user interface as array of soft buttons. The user may then select one of the contexts by pressing the associated button.

Processing parameter sets 832 and associated indicators 834, 836, 838 may be stored in the parameter memory 830 in several ways. Processing parameter sets 832 and associated indicators 834, 836, 838 may have been stored in the parameter memory 830 during manufacture of the personal audio system 800. Processing parameter sets 832 and associated indicators 834, 836, 838 may have been stored in the parameter memory 830 during installation of an application or "app" on the personal computing device that is a portion of the personal audio system.

Additional processing parameter sets 832 and associated indicators 834, 836, 838 stored in the parameter memory 830 may have been created by the user of the personal audio system 800. For example, an application running on the personal computing device may present a graphical user interface through which the user can select and control parameters to edit an existing processing parameter set and/or to create a new processing parameter set. In either case, the edited or new processing parameter set may be saved in the parameter memory 830 in association with one or more of a current ambient sound profile provided by the profile developer 822, a location of the personal audio system 800 provided by the geo-locator 860, and a context or name entered by the user via the user interface 850. The edited or new processing parameter set to be saved in the parameter memory 830 automatically or in response to a specific user command.

Processing parameter sets and associated indicators may be developed by third parties and made accessible to the user of the personal audio system 800, for example, via a network.

Further, processing parameter sets 832 and associated indicators 834, 836, 838 may be downloaded from a remote device, such as the sound knowledgebase 150 in the cloud 130, and stored in the parameter memory 830. For example, newly available or revised processing parameter sets 832 and associated indicators 834, 836, 838 may be pushed from the remote device to the personal audio system 800 automatically. Newly available or revised processing parameter sets 832 and associated indicators 834, 836, 838 may be downloaded by the personal audio system 800 at periodic intervals. Newly available or revised processing parameter sets 832 and associated indicators 834, 836, 838 may be downloaded by the personal audio system 800 in response to a request from a user.

To support development of new and/or revised processing parameter sets, the personal audio system may upload information to a remote device, such as the sound knowledgebase 150 in the cloud 130.

The personal audio system may contain an audio snippet memory 840. The audio snippet memory 840 may be, for example, a revolving or circular buffer memory having a fixed size where the newest data overwrites the oldest data such that, at any given instant, the buffer memory stores a predetermined amount of the most recently stored data. The audio snippet memory 840 may store a "most recent portion" of an audio stream, where the "most recent portion" is the time period immediately preceding the current time. The audio snippet memory 840 may store the most recent portion of the ambient audio stream input to the audio processor 810 (as shown in FIG. 4), in which case the audio snippet memory 840 may be located within one or both of the active acoustic filters of the personal audio system. The audio snippet memory 840 may store the most recent portion of an audio stream derived from the audio interface 350 in the personal computing device of the personal audio system, in which case the audio snippet memory may be located within the personal computing device 120.

In either case, the duration of the most recent portion of the audio stream stored in the audio snippet memory 840 may be sufficient to capture very low frequency variations in the ambient sound such as, for example, periodic frequency modulation of a siren or interruptions in a baby's crying when the baby inhales. The audio snippet memory 840 may store, for example, the most recent audio stream data for a period of 2 seconds, 5 seconds, 10 seconds, 20 seconds, or some other period.

The personal audio system my include an event detector 824 to detect trigger events, which is to say events that trigger uploading the content of the audio snippet memory and associated metadata to the remote device. The event detector 824 may be part of, or coupled to, the controller 820. The event detector 824 may detect events that indicate or cause a change in the active processing parameter set 825 used by the audio processor 810 to process the ambient audio stream. Examples of such events detected by the event detector include the user entering commands via the user interface 850 to modify the active processing parameter set 825 or to create a new processing parameter set; the user entering a command via the user interface 850 to save a modified or new processing parameter set in the parameter memory 830; automatic retrieval, based on location or ambient sound profile, of a selected processing parameter set from the parameter memory 830 for use as the active processing parameter set; and user selection, for example from a list or array of buttons presented on the user interface 850, of a selected processing parameter set from the parameter memory 830 for use as the active processing parameter set. Such events may be precipitated by a change in the ambient sound environment or by user dissatisfaction with the sound of the personal audio stream obtained with the previously-used active processing parameter set.

In response to the event detector 824 detecting a trigger event, the controller 820 may upload the most recent audio snippet (i.e. the content of the audio snippet memory) and associated metadata to the remote device. The uploaded metadata may include a location of the personal audio system 800 provided by the geo-locator 860. When the trigger event was a user-initiated or automatic retrieval of a selected processing parameter set from the parameter memory, the uploaded metadata may include an identifier of the selected processing parameter set and/or the complete selected processing parameter set. When the trigger event was the user modifying a processing parameter set or creating a new processing parameter set, the uploaded metadata may include the modified or new processing parameter set. Further, the user may be prompted or required to enter, via the user interface 850, a context, descriptor, or other tag to be associated with the modified or new processing parameter set and uploaded.

Figure 9:
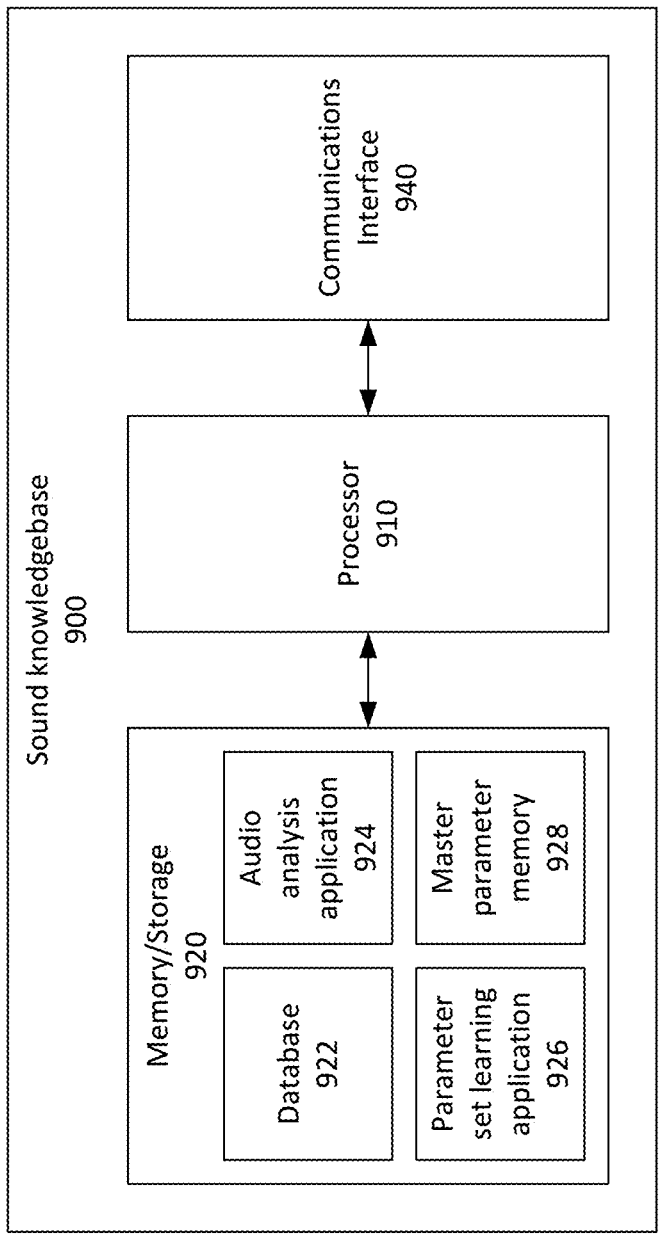
FIG. 9 is a block diagram of a sound knowledgebase.

FIG. 9 is a functional block diagram of an exemplary sound knowledgebase 900, which may be the sound knowledgebase 150 within the sound processing system 100. The term "knowledgebase" connotes a system that not only store data, but also learns and stores other knowledge derived from the data. The sound knowledgebase 900 includes a processor 910 coupled to a memory/storage 920 and a communications interface 940. These functions may be implemented, for example, in a single server computer or by one or more real or virtual servers within the cloud.

The processor 910 may be or include one or more microprocessors, microcontrollers, digital signal processors, application specific integrated circuits (ASICs), or a system-on-a-chip (SOCs). The memory/storage 920 may include a combination of volatile and/or non-volatile memory including read-only memory (ROM), static, dynamic, and/or magnetoresistive random access memory (SRAM, DRM, MRAM, respectively), and nonvolatile writable memory such as flash memory. The memory/storage 920 may include one or more storage devices that store data on fixed or removable storage media. Examples of storage devices include magnetic disc storage devices and optical disc storage devices. The term "storage media" means a physical object adapted for storing data, which excludes transitory media such as propagating signals or waves. Examples of storage media include magnetic discs and optical discs.

The communications interface 940 includes at least one interface for wired or wireless communications with external devices including the plurality of personal audio systems.

The memory/storage 920 may store a database 922 having a plurality of records. Each record in the database 922 may include a respective audio snippet and associated metadata received from one of a plurality of personal audio systems such as the personal audio system 800) via the communication interface 940. The memory/storage 920 may also store software programs and routines for execution by the processor. These stored software programs may include an operating system (not shown) such as the Apple®, Windows®, Linux®, or Unix® operating systems. The operating system may include functions to support the communications interface 940, such as protocol stacks, coding/decoding, compression/decompression, and encryption/decryption. The stored software programs may include a database application (also not shown) to manage the database 922.

The stored software programs may include an audio analysis application 924 to analyze audio snippets received from the plurality of personal audio systems. The audio analysis application 924 may develop audio profiles of the audio snippets. Audio profiles developed by the audio analysis application 924 may be similar to the profiles developed by the profile developer 822 in each personal audio system. Audio profiles developed by the audio analysis application 924 may have a greater level of detail compared to profiles developed by the profile developer 822 in each personal audio system. Audio profiles developed by the audio analysis application 924 may include features, such as low frequency modulation or discontinuities, not considered by the profile developer 922 in each personal audio system. Audio profiles and other features extracted by the audio analysis application 924 may be stored in the database 922 as part of the record containing the corresponding audio snippet and metadata.

The stored software programs may include a parameter set learning application 926 to learn revised and/or new processing parameter sets from the snippets, audio profiles, and metadata stored in the database 922. The parameter set learning application 926 may use a variety of analytical techniques to learn revised and/or new processing parameter sets. These analytical techniques may be applied to numerical and statistical analysis of snippets, audio profiles, and numerical metadata such as location, date, and time metadata. These analytical techniques may include, for further example, semantic analysis of tags, descriptors, contexts, and other non-numerical metadata. Further, the parameter set learning application 926 may use known machine learning techniques such as neural nets, fuzzy logic, adaptive neuro-fuzzy inference systems, or combinations of these and other machine learning methodologies to learn revised and/or new processing parameter sets.

As an example of a learning process that may be performed by the parameter set learning application 926, the records in the database 922 may be sorted into a plurality of clusters based according to audio profile, location, tag or descriptor, or some other factor. Some or all of these clusters may optionally be sorted into sub-clusters based on another factor. When records are sorted into clusters or sub-clusters based on non-numerical metadata (e.g. tags or descriptors) semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

The memory/storage 920 may include a master parameter memory 928 to store all parameter memory sets and associated indicators currently used within the sound processing system 100. New or revised processing parameter sets developed by the parameter set learning application 926 may be stored in the master parameter memory 928. Some or all of the processing parameter sets stored in the master parameter memory 928 may be downloaded via the communications interface 940 to each of the plurality of personal audio systems in the sound processing system 100. For example, new or recently revised processing parameter sets may be pushed to some or all of the personal audio systems as available. Processing parameters sets, including new and revised processing parameter sets may be downloaded to some or all of the personal audio systems at periodic intervals. Processing parameters sets, including new and revised processing parameter sets may be downloaded upon request from individual personal audio systems.

Figure 10:
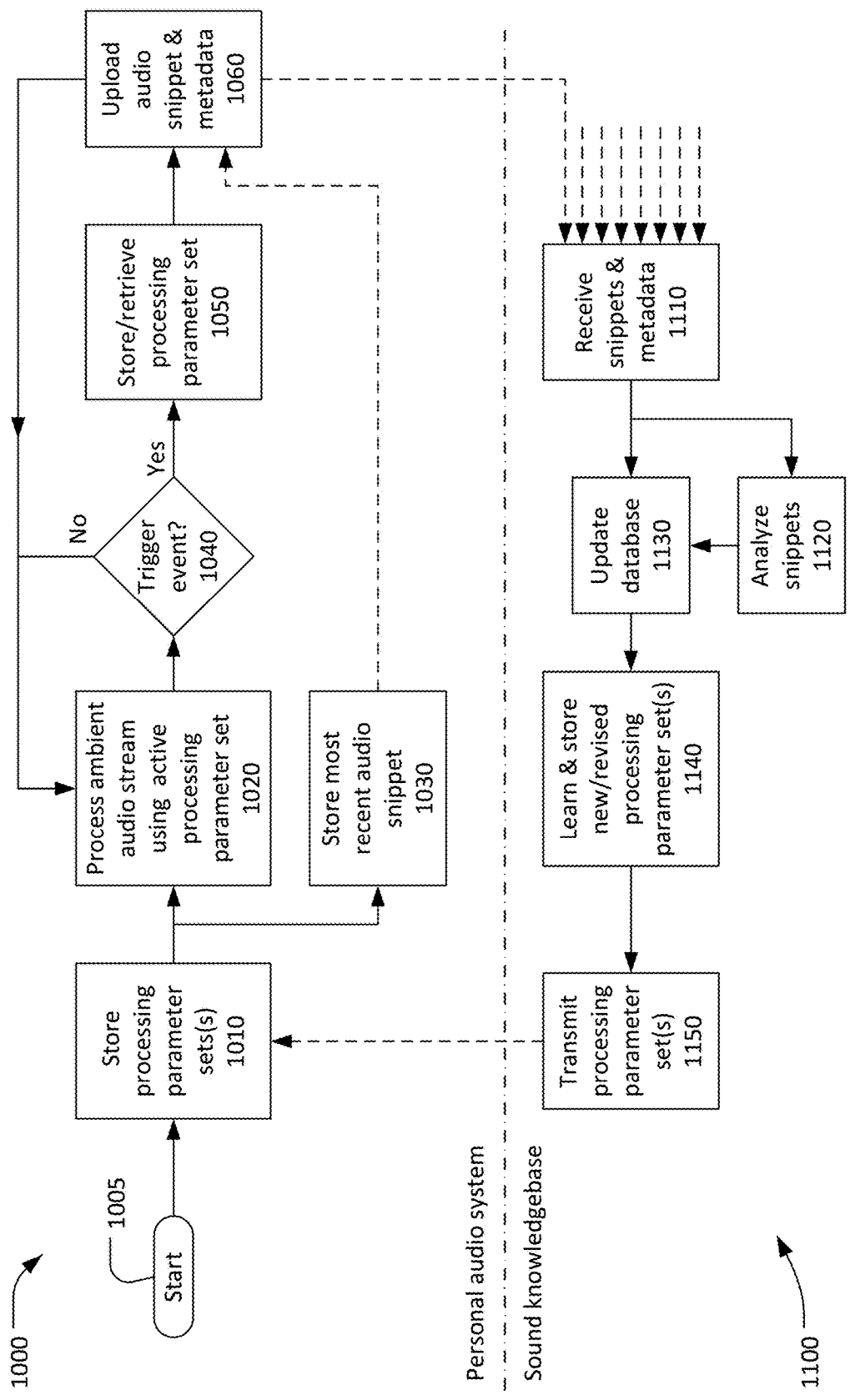
FIG. 10 is a flow chart of a method for processing sound using collective feedforward.

FIG. 10 shows flow charts of methods 1000 and 1100 for processing sound using collective feedforward. The methods 1000 and 1100 may be performed by a sound processing system, such as the sound processing system 100, which may include at least one personal audio system, such as the personal audio system 140, and a sound knowledgebase, such as the sound knowledgebase 150 in the cloud 130. The sound processing system may include a large plurality of personal audio systems. Specifically, the method 1000 may be performed by each personal audio system concurrently but not necessarily synchronously. The method 1100 may be performed by the sound knowledgebase concurrently with the method 1000. All or portions of the methods 1000 and 1100 may be performed by hardware, by software running on one or more processors, or by a combination of hardware and software. Although shown as a series of sequential actions for ease of discussion, it must be understood that the actions from 1110 to 1150 may occur continuously and simultaneously, and that the actions from 1010 to 1060 may be performed concurrently by the plurality of personal audio systems. Further, in FIG. 10, process flow is indicated solid arrows and information flow is indicated by dashed arrows.

The method 1000 may start at 1005 and run continuously until stopped (not shown). At 1010, one or more processing parameter sets may be stored in a parameter memory, such as the parameter memory 830, within the personal audio system. Initially, one or more processing parameter sets may be stored in the personal audio system during manufacture or during installation of a personal audio system application on a personal computing device. Subsequently, new and/or revised processing parameter sets may be received from the sound knowledgebase.

At 1020, an ambient audio stream derived from ambient sound may be processed in accordance with an active processing parameter set selected from the processing parameters sets stored at 1010. Processes that may be performed at 1020 were previous described. Concurrently with processing the ambient audio stream at 1020, a most recent portion of the ambient audio stream may be stored in a snippet memory at 1030, also as previously described.

At 1040, a determination may be made whether or not a trigger event has occurred. A trigger event may be any event that causes a change of or to the active processing parameter set used at 1020 to process the ambient audio stream. Examples of events detected by the event detector include a user entering commands via a user interface to modify the active processing parameter or to create a new processing parameter set, the user entering a command via the user interface to save a modified or to new processing parameter set in the parameter memory, and user-initiated or automatic decision to retrieve a different processing parameter set from the parameter memory for use at 1020 as the active processing parameter set.

When a determination is made at 1040 that a trigger event has not occurred ("no" at 1040), the processing at 1020 and storing at 1030 may continue. When a determination is made at 1040 that a trigger event has occurred ("yes" at 1040), a processing parameter set may be stored or retrieved at 1050 as appropriate. The storage/retrieval of the processing parameter set 1050 is either the storage of the current processing parameter set, for example, as selected by a user, in parameter memory 830. The retrieval is accessing of one or more parameter set into parameter memory 830.

At 1060, the most recent audio snippet (i.e. the content of the audio snippet memory) and associated metadata may be transmitted or uploaded to the sound knowledgebase. The uploaded metadata may include a location of the personal audio system provided by a geo-locator within the personal audio system. When the trigger event was a user-initiated or automatic retrieval of a selected processing parameter set from the parameter memory, the uploaded metadata may include an identifier of the selected processing parameter set and/or the actual selected processing parameter set. When the trigger event was the user modifying the active processing parameter or creating a new processing parameter set, the uploaded metadata may include the modified or new processing parameter set. Further, the user may be prompted to enter a context, descriptor, or other tag to be associated with the modified or new processing parameter set and uploaded. The process 1000 may then return to 1020 and continue cyclically until stopped.

At 1110, the sound knowledgebase receives the audio snippet and associate metadata transmitted at 1060 and may receive additional audio snippets and metadata from other personal audio systems. In addition, any audio profiles developed by the personal audio systems may be shared with the sound knowledgebase. Audio analysis may be performed on the received audio snippets at 1120. The audio analysis at 1120 may develop audio profiles of the audio snippets. Audio profiles developed by the audio analysis at 1120 may be similar to the profiles developed by the profile developer 822 in each personal audio system as previous described. Audio profiles developed by the audio analysis at 1120 may have a greater level of detail compared to profiles developed within each personal audio system. Audio profiles developed by audio analysis at 1120 may include features, such as low frequency modulation or discontinuities, not considered in the profiles developed within each personal audio system. Audio profiles and other features extracted by the audio analysis at 1120 may be stored in a database at 1130 in association with the corresponding audio snippet and metadata from 1110.

At 1140, machine learning techniques may be applied to learn revised and/or new processing parameter sets from the snippets, audio profiles, and metadata stored in the database 1130. A variety of analytical techniques may be used to learn revised and/or new processing parameter sets. These analytical techniques may include, for example, numerical and statistical analysis of snippets, audio profiles, and numerical metadata such as location, date, and time metadata. These analytical techniques may include, for further example, semantic analysis of tags, descriptors, contexts, and other non-numerical metadata.

As an example of a learning process that may be performed at 1140, some or all of the records in the database at 1130 may be sorted into a plurality of clusters based according to audio profile, location, tag or descriptor, or some other factor. Some or all of these clusters may optionally be sorted into sub-clusters based on another factor. When records are sorted into clusters or sub-clusters based on non-numerical metadata (e.g. tags or descriptors) semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

New or revised processing parameter sets learned and stored at 1140 may be transmitted to some or all of the plurality of personal audio systems at 1150. For example, new or recently revised processing parameter sets may be pushed to some or all of the personal audio systems on an as-available basis, which is to say as soon as the new or recently revised processing parameter sets are created. Processing parameters sets, including new and revised processing parameter sets may be transmitted to some or all of the personal audio systems at predetermined periodic intervals, such as, for example, nightly, weekly, or at some other interval. Processing parameters sets, including new and revised processing parameter sets may be transmitted upon request from individual personal audio systems. Processing parameter sets may be pushed to, or downloaded by, a personal audio system based on a change in the location of the personal audio system. For example, a personal audio system that relocates to a position near or in an airport may receive one or more processing parameters sets for use suppressing aircraft noise.

The overall process of learning new or revised processing parameter sets based on audio snippets and metadata and providing those new or revised processing parameter sets to personal audio systems is referred to herein as "collective feedforward". The term "collective" indicates the new or revised processing parameter sets are learned from the collective inputs from multiple personal audio systems. The term "feedforward" (in contrast to "feedback") indicates new or revised processing parameter sets are provided, or fed forward, to personal audio systems that may not have contributed snippets and metadata to the creation of those new or revised processing parameter sets.

Information collected by the sound knowledgebase about how personal audio systems are used in different locations, ambient sound environments, and situations may be useful for more than developing new or revised processing parameter sets. In particular, information received from users of personal audio systems may indicate a degree of satisfaction with an ambient sound environment. For example, information may be collected from personal audio systems at a concert to gauge listener satisfaction with the "house" sound. If all or a large portion of the personal audio systems were used to substantially modify the house sound, a presumption may be made that the audience (those with and without personal audio systems) was not satisfied. Information received from personal audio systems could be used similarly to gauge user satisfaction with the sound and noise levels within stores, restaurants, shopping malls, and the like. Information received from personal audio systems could also be used to create soundscapes or sound level maps that may be helpful, for example, for urban planning and traffic flow engineering.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method comprising:
at an electronic device including a user interface:
   receiving a first audio stream;
   detecting whether or not the first audio stream contains voice activity;
   displaying, on the user interface, a plurality of context affordances;
   after displaying the user interface, receiving a first user input corresponding to a selection of a first context affordance of the plurality of context affordances associated with a first context; and
   in accordance with receiving the first user input:
      retrieving a first set of processing parameters associated with the first context; and
      generating a first personalized audio stream by processing the first audio stream based on the first set of processing parameters associated with the first context, wherein generating the first personalize audio stream includes:
         processing the first audio stream through a filter bank configured to implement a first filter function when the first audio stream does not contain voice activity; and implement a second filter function, different from the first filter function, when the first audio stream contains voice activity.

2. The method of claim 1, further comprising:
receiving a second user input corresponding to a selection of a second context affordance of the plurality of context affordances associated with a second context different from the first context; and
in accordance with receiving the second user input:
   retrieving a second set of processing parameters different from the first set of processing parameters that associated with the second context; and
   generating a second personalized audio stream different than the first personalized audio stream by processing the first audio stream based on the second set of processing parameters associated with the second context.

3. The method of claim 1, further comprising:
receiving a second audio stream; and wherein generating the first personalized audio stream further includes processing the second audio stream.

4. The method of claim 1, further comprising:
estimating, by a pitch estimator, a frequency of a fundamental component of an annoyance noise contained in the first audio stream, wherein the annoyance noise is distinct from ambient noise contained in the first audio stream and corresponds to a specific source; and
wherein the filter bank includes band-reject filters to attenuate the fundamental component and at least one harmonic component of the annoyance noise, wherein the filter bank is configured to:
   in accordance with receiving a fundamental frequency value of the annoyance noise from the pitch estimator, adjust the band-reject filters to attenuate the fundamental component at the least one harmonic component of the annoyance noise; and
   implement the second filter function when one or more of the fundamental component and the at least one harmonic component of the annoyance noise overlap with one or more harmonics of a voice associated with the voice activity, wherein the second filter function attenuates the annoyance noise in one or more frequency bands that the annoyance noise overlaps with the voice.

5. The method of claim 1, wherein the first set of processing parameters is retrieved from a sound knowledge-base stored in a memory included on the electronic device.

6. The method of claim 1, wherein the plurality of context affordances includes at least one context selected from the set of: a physical location, user activity, date, and/or time of day, an environment, and a situation.

7. The method of claim 1, wherein displaying plurality of contexts is performed in response to receiving a user request.

8. The method of claim 1, further comprising:
in response to detecting a trigger event, automatically retrieving a third set of processing parameters different from the first set of processing parameters; and
generating a third personalized audio stream different than the first personalized audio stream by processing the first audio stream based on the third set of processing parameters.

9. The method of claim 8, wherein the trigger event is based on a location.

10. The method of claim 1, further comprising:
after generating the first personalized audio stream, causing audio based on the first personalized audio stream to be output by one of more audio transducers.

11. The method of claim 1, wherein:
the user interface includes a touchscreen; and
the first user input corresponds to a touch input at a location on the touchscreen.

12. A non-transitory computer-readable storage medium storing one or more programs configured to be executed by one or more processors of an electronic device with a user interface, the one or more programs including instructions for:
receiving a first audio stream;
detecting whether or not the first audio stream contains voice activity;
displaying, on the user interface, a plurality of context affordances;
after displaying the user interface, receiving a first user input corresponding to a selection of a first context affordance of the plurality of context affordances associated with a first context; and
in accordance with receiving the first user input:
retrieving a first set of processing parameters associated with the first context; and
generating a first personalized audio stream by processing the first audio stream based on the first set of processing parameters associated with the first context, wherein generating the first personalize audio stream includes:
processing the first audio stream through a filter bank configured to implement a first filter function when the first audio stream does not contain voice activity; and implement a second filter function, different from the first filter function, when the first audio stream contains voice activity.

13. An electronics device, comprising:
a user interface;
one or more processors; and
a memory storing one or more programs configured to by executed by the one or more processors, the one or more programs including instructions for:
receiving a first audio stream;
detecting whether or not the first audio stream contains voice activity;
displaying, on the user interface, a plurality of context affordances;
after displaying the user interface, receiving a first user input corresponding to a selection of a first context affordance of the plurality of context affordances associated with a first context; and
in accordance with receiving the first user input:
retrieving a first set of processing parameters associated with the first context; and
generating a first personalized audio stream by processing the first audio stream based on the first set of processing parameters associated with the first context, wherein generating the first personalize audio stream includes:
processing the first audio stream through a filter bank configured to implement a first filter function when the first audio stream does not contain voice activity; and implement a second filter function, different from the first filter function, when the first audio stream contains voice activity.

\* \* \* \* \*